UNITED STATES PATENT OFFICE.

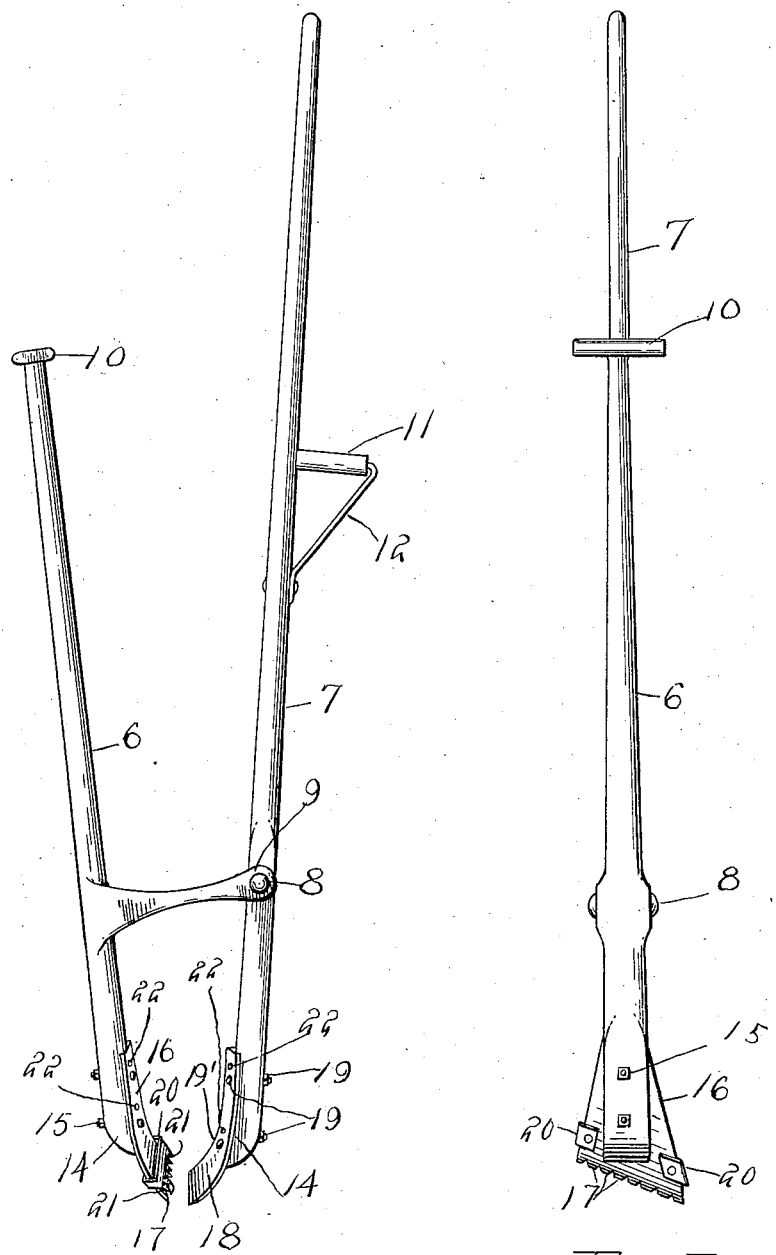

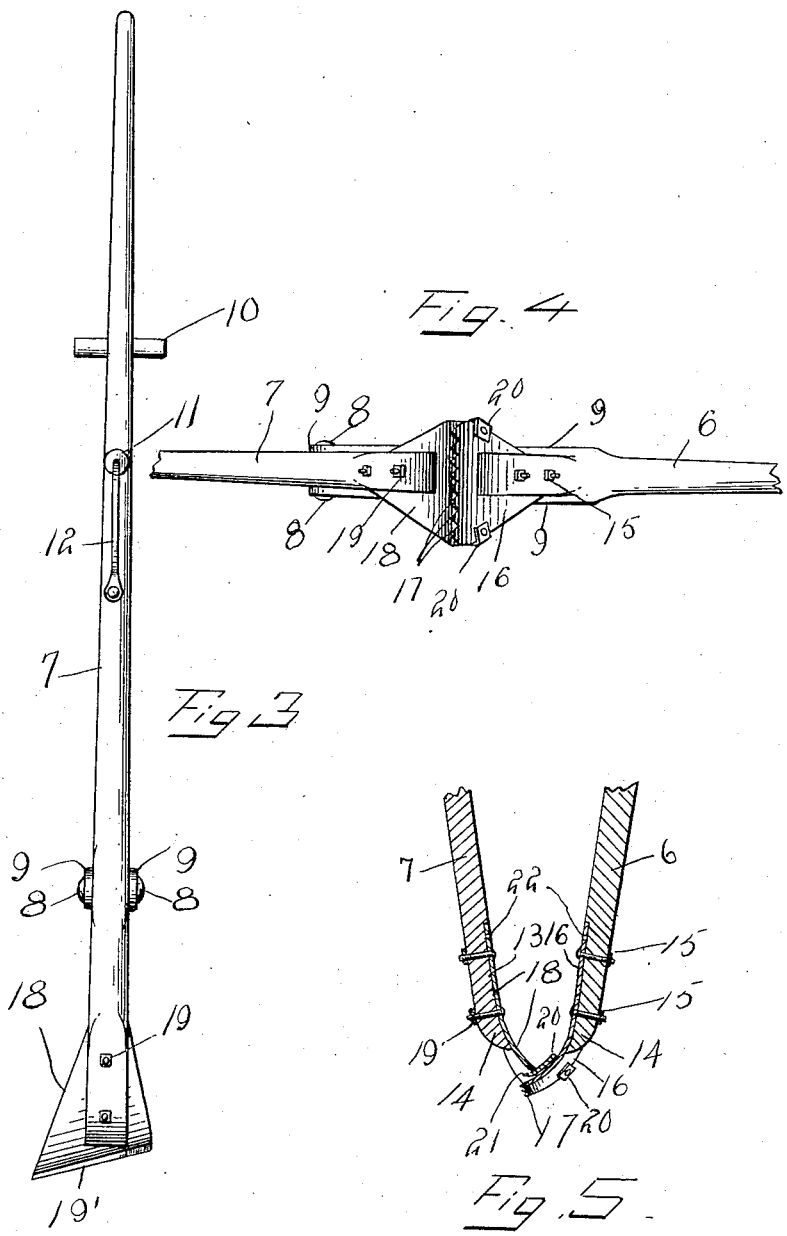

REDELL H. BECKWITH, OF SPARTA, MICHIGAN.

BEAN-PULLER.

No. 884,887.  Specification of Letters Patent.  Patented April 14, 1908.

Application filed October 12, 1907. Serial No. 397,174.

*To all whom it may concern:*

Be it known that I, REDELL H. BECKWITH, a citizen of the United States, residing at Sparta, in the county of Kent, State of Michigan, have invented certain new and useful Improvements in Bean-Pullers; and I do hereby declare the following to be a full, clear, and exact description of the invention, such as will enable others skilled in the art to which it appertains to make and use the same.

This invention relates to bean pullers and has for its object to provide an implement which may be used in pulling bean vines and which will obviate stopping during the pulling operation.

A further object of the invention is to provide suitable elements for grasping and severing the bean stalks from the roots, thereby obviating the carrying of the roots and the dirt clinging thereto, into the barn. This means consists of a pair of bean gripping and cutting plates which are supported at the lower ends of handles and one of the plates is provided with a straight cutting edge and the other with a toothed edge, the two edges being arranged to have a shearing action.

Another feature of the invention resides in the fact that the two edges mentioned above are cut at an angle so that the handles need not be held vertical when the device is in use.

In the accompanying drawings, Figure 1 is a front elevation of the device, Fig. 2 is a view in elevation of one side thereof, Fig. 3 is a similar view of the other side, Fig. 4 is a bottom plan view of the implement, and, Fig. 5 is a detail vertical transverse sectional view through the lower end of the implement showing the manner in which the blades thereof meet.

As shown in the drawings, the device comprises a handle 6 and a handle 7 which are pivoted together by means of a pivot bolt 8 which is engaged through the handle 7 and a pair of spaced ears 9 which are formed integral with the handle 6 and between which the handle 7 is received. At its upper end, the handle 6, which is shorter than the handle 7, is provided with a transverse hand grip 10 and upon the handle 7, intermediate its upper and lower ends, is fixed a laterally extending hand grip 11 which is firmly supported by means of a brace 12. The handles are gradually broadened towards their lower ends and the opposing faces of the said handles at their extreme lower ends are rabbeted as at 13 and slightly curve toward each other as at 14 at their extremities. Secured by means of bolts 15 to the rabbeted face of the handle member 6 is a blade which is in the form of a plate 16. The lower edge of this blade is cut at an angle and toothed as indicated at 17 and the lower portion of the plate is curved to conform to the curvature of the inner or rabbeted face of the handle 6 to which it is secured. A blade in the form of a plate 18 is bolted as at 19 to the rabbeted face of the handle 7 and is curved to a degree corresponding to the curvature of the plate 16 and is of the same dimensions with the exception that its lower edge is sharpened and is straight as indicated at 19'. The lower edges of the two plates, as heretofore stated, are cut at an angle with their higher portions rearwardly so that when the implement is in use, the handles may be held at a convenient angle and the edges of the blades will then be parallel with the surface of the ground. The blade 16 has riveted or otherwise secured to it a strip 20 which has its lower edge toothed as at 21 to extend in parallel relation to the corresponding edge of the blade 16. It will be seen from the foregoing that the blade 16 has, in effect, two parallel toothed edges and that the stalk will be more firmly held thereon than if only one such edge were employed.

In using the implement, the handle or hand grip 11 is grasped in the left hand with the upper end of the handle 7 extending through the left arm pit of the user and the hand grip upon the handle 6 is grasped in the right hand. The two handles may then be manipulated so as to bring their blades into contact and cut the beans from the vines, it being understood of course that the blade upon the handle 6 is so positioned as to have a shearing movement upon the edge of the blade carried by the handle 7, the stems being held by the teeth upon the edge of the blade 18 and being forced by the movement of the blade into shearing engagement with the sharp cutting edge of the blade upon the handle 7.

In order that the blades may be adjusted relatively so that when the handles are operated, either a shearing action may be produced or the blades may be brought together so as to grasp the saw to the vines and permit of their being pulled, root and all, an extra pair of bolt openings 22 is formed through each of the blades and these are designed for the passage of the bolts for securing the blades to the lower ends of the handles it being understood that the blades may be relatively adjusted upon the two handles so as to produce one or the other of the actions mentioned above.

What is claimed, is—

1. A device of the class described comprising a pair of pivoted handle members, and blades carried at the lower ends of the members, the blade upon one member having a straight cutting edge and the other blade being provided with two parallel spaced toothed edges.

2. A device of the class described comprising a pair of pivoted handle members, and blades carried at the lower ends of the members, the blade upon one member having a straight cutting edge and the other blade being formed with a toothed edge, and a smaller supplemental blade secured to the last mentioned blade and formed also with a toothed edge.

3. A device of the class described comprising a pair of pivoted handle members, and blades carried at the lower ends of the members, the blade upon one member having a straight cutting edge and the other blade being formed with a toothed edge, and a smaller supplemental blade secured to the last mentioned blade and formed also with a toothed edge, the two toothed edges of the last mentoned blades being parallel and spaced.

In testimony whereof, I affix my signature, in presence of two witnesses.

REDELL H. BECKWITH.

Witnesses:
   CORNELIA M. KRAFT,
   PAULINE ADE.